June 10, 1952 A. DAL BORGO 2,600,212
METHOD OF MANUFACTURING LAMELLIFORM EARTHENWARE
Filed Jan. 7, 1950 2 SHEETS—SHEET 1

Inventor

A. Dal Borgo
By Wenderoth, Lind & Ponack
Attorneys

June 10, 1952  A. DAL BORGO  2,600,212
METHOD OF MANUFACTURING LAMELLIFORM EARTHENWARE
Filed Jan. 7, 1950  2 SHEETS—SHEET 2

Inventor
A. Dal Borgo
By Wenderoth, Lind & Ponack
Attorneys

Patented June 10, 1952

2,600,212

UNITED STATES PATENT OFFICE 2,600,212

METHOD OF MANUFACTURING LAMELLIFORM EARTHENWARE

Antonino dal Borgo, Sassuolo, Italy

Application January 7, 1950, Serial No. 148,255
In Switzerland January 7, 1949

7 Claims. (Cl. 25—156)

The present invention has for its object the manufacture of earthenware composed of at least two layers of different materials of comparatively large superficial extent as compared with their thickness, for instance such as flooring tiles or plates or slabs the thickness of which may vary e. g. between 1 and 6 mm.

Methods of manufacturing such lamelliform earthenware as flooring tiles or plates or the like are known which consist in covering a fireproof support with one or several layers of a green non-solid ceramic material (which may be a paste, a powder or even a thick liquid) and then heating the support together with the layer or layers carried thereby in order to bake the non-solid ceramic material into a solid body. Said support may be provided with a separation layer intended, following the baking process, to facilitate the stripping of the article, then with a layer of green ceramic material which contingently may in turn be covered with a glaze, the two last-mentioned layers being converted during the backing step into a solid article.

One of the main difficulties encountered in such manufacturing processes is the shrinkage of the ceramic material during the drying and the baking of the same. The said shrinkage occurs in all the three dimensions and in direct proportion to the same provided it is not counteracted; the result is that neither the shape nor the sizes of the baked article are the same as those of the blank made of green material.

According to the invention, rather than trying to avoid the warping and fissuration of the finished earthenware by facilitating the shrinkage in the direction of the larger dimensions of the article, the problem has been resolved in a seemingly paradoxical manner by precluding such a shrinkage altogether. For this purpose an adhesion must be obtained during the manufacturing process between the earthenware and its support which is sufficient to resist the shrinking stresses and to give the paste such a cohesion that fracture or warping of the article are avoided. Theoretical consideration and numerous experiments effected by the applicant have revealed that such a result can be obtained owing to the fact that by virtue of the aforementioned adhesion and cohesion and of the baking being effected in the stressed state determined by said forces the shrinkage can be converted from three dimensionality to unidimensionality (merely in the direction of the height) in such a manner that the total decrease in volume will remain the same as if the blank were free to shrink in all directions.

The method according to the invention is characterized thereby that the composition of the non-solid material deposited on the support and the character of the latter are such that on the one hand, during that period of the backing step during which the temperature rises within said material the cohesion of the particles same is made of as well as its adhesion to the support are sufficiently high that practically any shrinkage occurring in the ceramic material in the course of its baking will only result in a decrease in the thickness of the material present on the support, consequently without any slip between the latter and the said material, and on the other hand that at least towards the end of the cooling period said adhesion is lowered to a value consistent with an easy stripping of the solid article obtained.

Due to the fact that no slip will occur in the course of the baking process between the ceramic material and the support, the baked article will cover the same surface of the support as did the non-solid green ceramic material prior to the baking process. It is thus possible to obtain baked lamelliform articles the larger faces of which have the same shape and size as the supports on which the green material has been deposited originally. This provides for uniformity in the manufacture, whereby waste is avoided.

The present invention extends also to an embodiment that makes it possible to decrease the costs of the said earthenware while improving its quality; effectively, it makes it possible to use a coarse paste and to reduce the thickness of the glaze layer; with this end in view a ground layer is cast on a refractory support which consists of a coarse and consequently cheap paste, over which a finishing coat is applied, after which the whole is covered with a glaze.

In the production of these earthenware articles the non-solid ceramic material can be incised to such an extent that once baked the material can easily be broken neatly at the place where the incision was made.

With this end in view one may avail one's self either of a cutting tool or of a thin jet of a fluid under pressure. In the latter case however the inconvenience has been experienced that where the jet comes out of a nozzle, it has a turbulent character which is detrimental to the obtainment of a perfectly neat incision. In order to remedy this inconvenience, according to the invention, the incision may be effected with the aid of a fluid film projected at high speed by centrifugal action and directed towards that place of the ceramic material which it is desired to incise.

Figure 1:
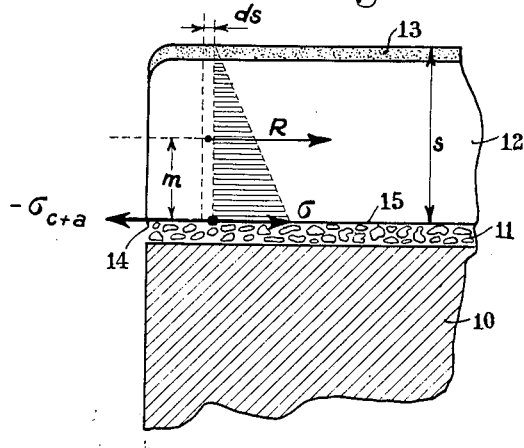
Figure 1 is a fractional cross section of an earthenware article on its support.

As shown in Fig. 1 the support 10 made of fire-resisting material is covered directly with an isolating layer 11. Deposited on the said layer is a layer 12 of a non-solid, e. g. paste-like ceramic material which once baked will be converted to the solid state. Last, the layer 12 is covered with a glazer enamel layer 13 which also will be converted (vitrified) in the source of the making process.

As the said support and the layers thereon are dried, then heated, and as the baking process begins, and unless special precautions are taken, a shrinkage occurs in layers 12 and 13, which is attended with a slip on the isolating layer 11. Where such a slip is not counteracted the result is simply a decrease in the size of the article; where the slip is not wholly free the shrinkage tends to result in the warping up of the edges of layers 12 and 13, the layer 12 tending to separate from the layer 11 in the neighbourhood of point 14.

Consequently, in conventional practice, in order to allow such a slip to occur, the "body" of the layer 11 is so chosen that a slip can easily occur between the support 10 and the layer 12; however, due to the considerable friction occurring over such a large surface, the said slip will scarcely occur in a uniform manner, so that no uniformity is secured in the manufacture. Effectively, as the pasty material providing the layer 12, which is made up of a ceramic material of conventional composition (containing clay-like ingredients such as clay, kaolin, bentonite) is heated up (to a temperature of about 500° C.), an abrupt contraction will occur due to the dissociation of the kaolin molecule. Due to the fact that said contraction is counteracted, considerable stresses are set up in layer 12. The magnitude of the said stresses is proportional to the size of the material in the direction in which they occur. Since the shrinkage is not counteracted in the direction at right angles to the face 15 of the support 10, the stresses generated by the shrinkage will occur in planes parallel with said face and will increase from the top surface of layer 13 down to the bottom of layer 12 as shown in Fig. 1. In the last-mentioned surface they will be the higher as the shrinkage and the counteracting action are more considerable. These stresses as a whole generate a bending moment in each infinitesimal element $ds$ of layers 12 and 13. The sum of these bending moments is equal to the resultant R of all the stresses multiplied by the distance $m$ which is one half of the total thickness $s$ of layers 12 and 13. These bending moments are what cause the curling up at point 14 where no free slipping possibility exists in layer 11, for the reason that at the edges of the layers cohesion is single-sided. For the same reason, once the curling effect is initiated, it will proceed from the edge towards the inside. The stresses set up by the tendency to shrink may also result in fractures in the layers 12 and 13 whenever they exceed the force of cohesion of the particles that constitute the said layers.

The internal stresses that occur at the boundary between the isolating layer 11 and the layer 12 may be represented by a vector $\sigma$. The forces that counteract these stresses are those which result from the cohesion of the particles constituting the layer 12 and from the adhesion of layer 12 to layer 11; these forces of cohesive and adhesive origin are represented by the vector $\sigma_{c+a}$ which is opposite in direction to vector $\sigma$. Whenever $\sigma > \sigma_{c+a}$ a slip will occur in layer 12 with respect to layer 11; whenever the moment R.$m$ is less than ¼ of $\sigma_{c+a}$ a curling of the layer 12 will occur; whenever $\sigma < \sigma_{c+a}$ no slip will occur; however, cracks are liable to occur in layer 12. If in this case $\sigma$ is less than the cohesion between the particles of layer 12, no cracks will occur in the said layer.

Figure 2:
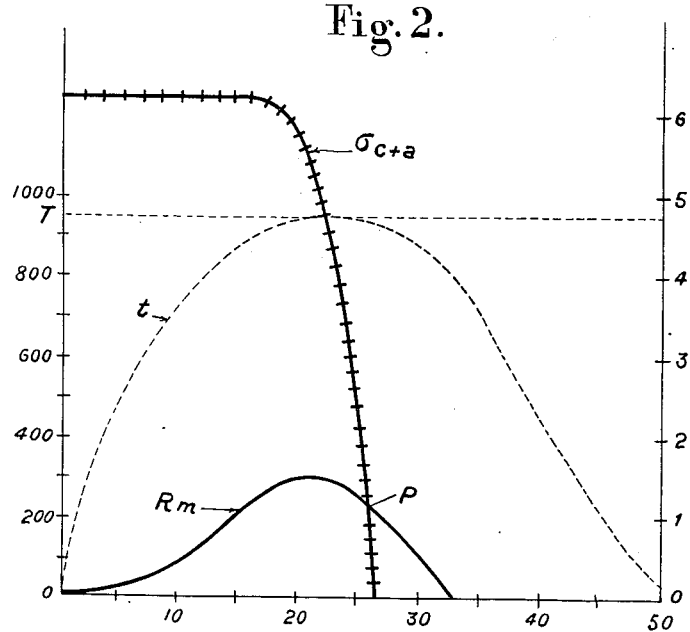
Figure 2 is an explanatory diagram.

Fig. 2, which is related to the method according to the invention, is a diagram in which the travel of a support from the point where it enters the oven to the one where its cooling is completed is plotted in metres as abscissae while the temperature of the support and of the layers is plotted in degrees centigrade as ordinates at the left, and the total of the cohesion forces between the particles of the layer of ceramic material plus the adhesion forces of said layer to the support is plotted in kgs./sq. cm. as ordinates at the right which also correspond to the value R.$m$ expressed in kgs./cm. and defined hereinbefore. The said diagram shows what relation must prevail between the R.$m$ and the $\sigma_{c+a}$ values and temperature if it is desired that practically the shrink be offset altogether by a decrease in the thickness of the ceramic material layer and that at the completion of the baking process the article can be stripped easily from its support. In the said diagram the value of $\sigma_{c+a}$ remains higher than 4 R.$m$ until the baking process is completed whereas by the end of the cooling process the said forces $\sigma_{c+a}$ must be lower than R.$m$ in order that the article can be stripped from its support. Effectively, it will be appreciated that the curve representing the bending moments R.$m$ intersects the one representing the cohesion and adhesion forces $\sigma_{c+a}$ at P which is beyond the apex of the baking temperature curve.

Where no isolating layer 11 is used its effect is replaced by the conditions prevailing at the surface of contact between layer 12 and support 10. In this case the chemical composition and the stiffness of the support are of capital importance. The chemical composition of the support must be such that any combination with the pasty material laid thereon is avoided, for want of what, as a consequence of the baking effect, the lamina would cake to the support. Moreover, the body and expansion coefficient of the support must assist the stripping of the lamina at the end of the baking process. As to the pasty material providing the layer 12, it should be so composed that it will adhere to the support during the first period of the baking process; in other words, it must supply the action of the isolating layer at the boundary surface.

Tests have revealed that in order to secure the conditions of the method according to the invention, it is essential that: (a) the adherence (cohesion and adhesion) effect of certain constituents, (b) the volumetric shrinkage, (c) the grain size be accounted for in the composition of the green pastes.

At equal adherence and equal percentage of adhesive constituents, cohesion and adhesion will increase in relation to the fineness of the particles agglomerated by the adhesive; in its turn, the shrinkage will increase in direct relation to said fineness and also to the percentage of volatile constituents of the mixture (water, carbon dioxide, and so on). Consequently, in order to obtain force diagrams such as the one shown in Fig. 2, the said factors must be suitably chosen and related to one another. The best results are obtained, according to this invention, by minimizing the shrinking tendency in the pasty material (layer 12) as well as in the isolating layer 11, and this, because the forces σ (and consequently forces R) are related directly to the said tendency. Also the tendency to warp, which is determined by the magnitude of R, will decrease with a decrease in the tendency to shrink. In view of the fact that cohesion and adhesion are two factors that determine the resistance to slipping, the layers 12 and 11 must contain a sufficient percentage of binder. It is quite clear that the cohesion and the minimum shrinkage factors are contradictory since the binder (colloidal or greasy materials) are subject to a considerable contraction. The problem is resolved by an adequate crushing of the components and by a judicious distribution of the colloidal constituents. In this manner compounded mixtures are obtained in which the percentage of lean and consequently cheap materials is very high while the percentage of "mineral binders" is a minimum.

It is to be remarked in this respect that said binders must not possess the same chemicophysical character in the isolating layer 11 and the pasty layer 12. Effectively, the diagram represented in Fig. 2 shows that when the pasty material begins to soften (at a temperature of about 800° C. in the following example) and when capillarity effects come into play at the surface, the layer 11 must be sufficiently consistent to prevent not only the sheet layer 11 from clogging to its support during the heating-up period, but also the superficial tension of the pasty material softened at a high temperature from curling up the sheet at the edges thereof likewise at the end of said period.

Practice has shown that the best results are obtained by so adjusting the composition, the grinding, the sizing and the percentage of the particles that a capillary effect is obtained in the isolating layer which considerably exceeds the one set up in the pasty material, i. e. by raising the superficial stresses to a maximum in order that cohesion may become subordinate as compared therewith.

In the top temperature zone, where even the colloid in the isolating layer is deprived of any further binding capacity, the vitrifiable constituents of the paste and of the glaze are converted to the fluid state, capillarity in the sheet material is decreased and the adhesion of layer 11, although decreased, remains sufficient. Of course, this involves an accurate study of the fluidity of the constituents at stake and of their melting point intervals in view of the dehydration temperature of the isolating layer 11.

The following is an example of what the chemical and physical properties on the one hand of the green paste layer and on the other hand of the separating layer may be, in order that shrinkage shall only occur in the direction of the thickness of said layers and not in the two other directions thereof (i. e. at right angles to the thickness of the same) and that subsequent to baking at a temperature of about 950° C. the lamelliform article can be stripped easily:

(a) *Composition of the non-aqueous portion of non-solid green paste*

|  | Per cent |
|---|---|
| Kaolin | 8.5 |
| Talc | 7.5 |
| Scrap glass | 35.4 |
| Further lean ingredients (sand, porcelain scrap, etc.) | 48.00 |
| Bentonite | 0.5 |
| Sodium phosphate | 0.1 |

(b) *Preparation of the green paste*

Into a ball crusher having a diameter of 180 cm. and a length of 180 cm. there are introduced 900 kgs. of the material defined hereinbefore under a—the grains of lean materials having a diameter less than 1 mm.—1260 kgs. of firestone pebble and 1350 litres of water. The crushing is carried out for about 20 hours. The crusher being revolved at the speed of 80 to 100 R. P. M.

(c) *Composition of the non-aqueous portion of the separating layer*

|  | Per cent |
|---|---|
| Plastic clay | 27.00 |
| Powdered limestone | 72.65 |
| Peptized bentonite | .2 |
| Sodium pyrophosphate | .15 |

(d) *Preparation of the material for the separating layer*

A drum mill having a diameter of 60 cm. and a length of 60 cm. is filled with 30 kgs. of the dry material indicated under c hereinbefore, 42 kgs. of firestone pebble and 150 litres of water. The crushing is carried out for about 22 hours, the mill being revolved at a speed of 120 to 150 R. P. M. The supports may be metallic or not, or made of a mixture of metal particles with a non-metallic material, porous or compact.

In the manufacture of these ceramic products the following procedure may be adopted:

First of all a ground layer made up of a coarse and consequently cheap paste is cast on a refractory support provided with an anti-adhesive coat. Said paste may contain coarsely ground trimming scrap from a preceding cycle of operation. Said scrap is used without sorting as to its colour. The proportion of trimming scrap to the new paste may be as high as 33% as stated hereinbefore.

Thereafter, the said ground layer is covered with a finishing coat, i. e. with an opaque and well comminuted paste of finer quality having a thickness of some tenths of a millimeter, for instance 0.3 to 0.4 mm. The presence of this finishing coat is intended to completely conceal the coarse ground layer and the colored trimming scrap contained therein. Thereafter a glaze of the desired colour is applied.

The ground layer may be ground as coarsely as desired, within the limits consistent with the possibility of easily obtaining the desired thickness. Effectively, the finishing coat can be very finely comminuted in order to give a very smooth surface on which an even very thin and consequently low-cost glaze will suffice to give a satisfactory appearance and a smooth and glazed surface to the objects obtained.

The application of the finishing coat is effected in the same manner as that of the ground layer, which means that three distributors are availed of which respectively contain the ground paste, the finishing paste and the glazer. The refractory support is moved successively across the three distributors to receive the three aforementioned layers one after the other. One or several of the said layers may be deposited by drawing; it may be deposited as a powder.

The method just described is particularly easy in its application since it will make it possible to use lean mixtures, whereby the application of the finishing coat is reliable and easy as known in ceramic practice. In contrast thereto the application of the finishing coat is almost impossible in the conventional production of pressed slabs, and it is very difficult in the production from wet paste owing to the necessity to adapt the paste to the finishing coat on the one hand and the latter or the glaze on the other hand as to the shrinkage, the drying and the baking. In contrast thereto, the method described above makes it possible to secure this result easily since the successive application of two layers of lean and liquid layers as described hereinbefore and carried out at any desired time interval leads to perfect adhesion between the two layers. The application of a finishing coat on articles manufactured on a potter's wheel or cast in plaster molds or pressed can only be effected when the first layer is already too dry to become united with the finishing layer at the surface of contact. The same difficulty occurs, although to a less extent, in glazing.

Figure 3:
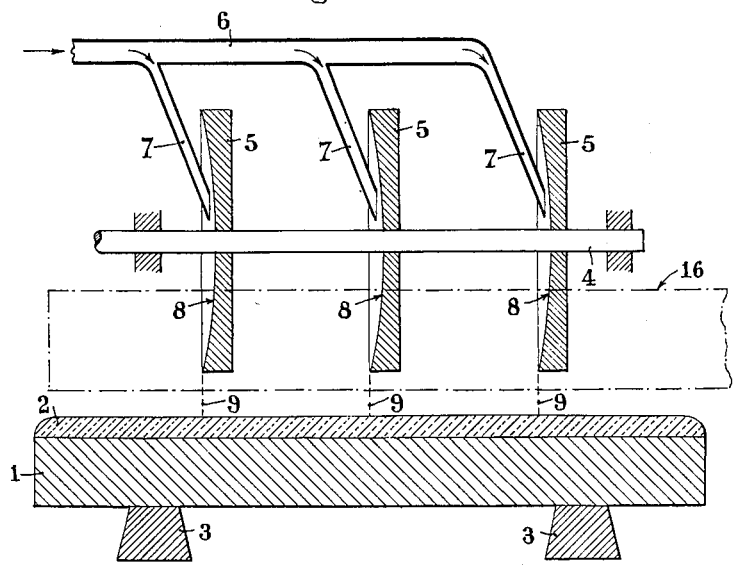
Figure 3 is a longitudinal section of a device used in incising the non-solid material along the separation lines.
Figure 4:
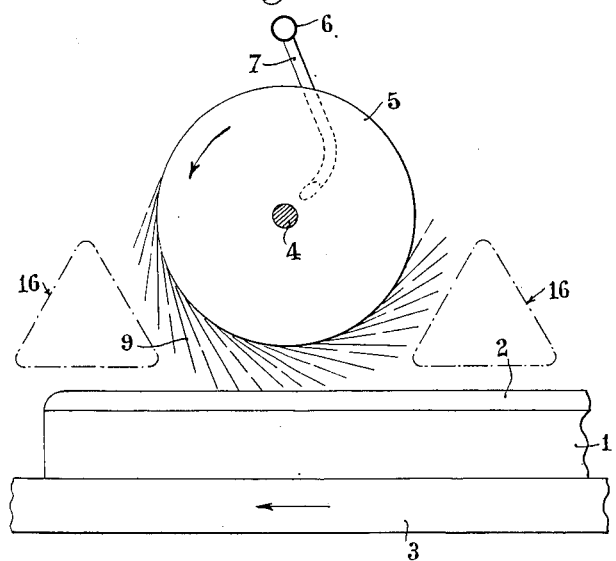
Figure 4 is a corresponding end view.

A support is illustrated at 1 in Figs. 3 and 4 on which the non-solid ceramic material has been deposited in the form of a layer 2. At point 3 a conveyor has been indicated diagrammatically which serves to move 1 and 2 in the direction of the arrow shown in Fig. 4. Above this a horizontal shaft 4 is aranged to which a rapid rotational movement is imparted by means not shown and which carries three members 5 having the shape of plano-convex lenses. At 6 there is provided a pipe for the supply of a gaseous or a liquid fluid, e. g. water or air. Tubes 7 branch off from said pipe which lead into the inside of the concavity 8 of the members 5 close to the shaft 4.

The operation of the arrangement shown is as follows:

The fluid discharged from the tubes 7 and coming into contact with the concave surface 8 of the rapidly rotated members 5 is set into rotation by the same and is rapidly driven towards the outside by the centrifugal action in the shape of a film free from any turbulence. The film in question is indicated at 9 and it is directed towards the desired places on the ceramic material 2 to produce the incision the depth of which should be sufficient to make it possible, once the article is baked, to break the material easily and neatly at the place of said incision. The said action of the film 9 takes place during the movement of the conveyor 3. Of course, Figs. 3 and 4 only represent an embodiment of the method, and this, merely for the purpose of exemplification.

The rapidly moved fluid film thus acts in the manner of a cutter, with the advantage over the latter that it undergoes no wear; practically, where a cutter is used, such a wear results in either in irregularities of the cut or variations in the depth of the same. A further advantage of the use of a rapidly moved fluid film over mechanical cutting tools is the small differences that may exist in the height of the various supports are made immaterial. Practice has revealed that 50 to 80 mm. are the most favorable values of the diameter of the disc and 30 to 60 ccm. per minute those of the water supply from the same.

Of course, advantageously, means not shown are provided to dispose of the fluid (in the case of a liquid) following its action upon the material 2. Said means may consist in suction pipes indicated diagrammatically at 16, arranged close to the layer 2 at either side of the discs shown in Fig. 4. Said pipes may be made of wire gauze or of perforated sheet metal. They are triangular in cross section. The depth of the cut can be varied quite accurately by varying the rotational speed of the members 5. The distance between these various members 5 can also be varied. In order to obtain absolutely clean edges propellers may be arranged coaxial with said members in order to create a ventilation owing to which the material removed from the cut is immediately set aside of the layer 2.

The enamel may be applied before or after the incision step. By applying it afterwards the following advantage is obtained: If at the time the incision is effected part of the glaze is undesignedly eliminated or if some diffusion of the same into the paste is effected undesignedly this will have no importance since the enamel applied thereafter will level out the unequalities, whereby a perfect finish of the object can be obtained. The enamel may be applied by any known means. Thus, for instance, the application of the enamel may be effected with the aid of the means described, the discs then being arranged at an angle to the direction of displacement of the conveyor. Effectively, by suitably adjusting the rotational speed of the discs and their distance to the layer 2 the result is obtained that the films 9 are converted to a mist adjacent to the said layer, which is quite propitious to a satisfactory enamelling.

I claim:

1. A method of preparing vitrified layered ceramic sheetware of characteristic unidirectional shrinkage along the thickness thereof during firing, comprising the steps of spreading first on an inert fire resistance support an isolating aqueous ceramic paste layer of unidirectional shrinkage during firing serving after heating to facilitate the separation of the vitrified tile product from the inert support, said isolating paste layer containing on dry weight basis an amount ranging about a quarter of plastic clay and few units per thousand of colloidal bentonite, the remainder comprising chiefly limestone, thereafter spreading on said layer before firing at least one unfired aqueous ceramic paste layer of unidirectional shrinkage during firing, this latter aqueous paste consisting of a ground mixture containing principally on a dry weight basis an amount ranging about 8% of kaolin, 7% of talc, 0.5% of colloidal bentonite, 0.1% of sodium phosphate the remainder consisting of lean ingredients ground to a particle diameter of less than one millimeter, thereafter spreading a thin layer of enamel glaze, firing the plural layers to vitrify and solidify the ceramic sheetware, and separating from the inert support the fired tile thus formed, which latter operation is facilitated after heating by the presence of the isolating layer.

2. A method of preparing vitrified layered ceramic sheetware of characteristic unidirectional shrinkage along the thickness thereof during firing, comprising the steps of spreading first on an inert fire resistant support an isolating aqueous ceramic paste layer of unidirectional shrinkage during firing serving after heating to facilitate the separation of the vitrified tile product from the inert support, said isolating paste layer containing on dry weight basis an amount ranging about a quarter of plastic clay and few units per thousand of colloidal bentonite, the remainder comprising chiefly limestone and coarsely ground lean material, thereafter spreading on said layer before firing at least one unfired aqueous ceramic paste layer of unidirectional shrinkage during firing, this latter aqueous paste consisting of a ground mixture containing on a dry weight basis 8.5% of kaolin, 7.5% of talc, 35.4% of scrap glass, 48% of further lean ingredients, said scrap glass and further lean ingredients being ground to a particle diameter of less than one millimeter, 0.5% of colloidal bentonite and 0.1% of sodium phosphate, thereafter spreading a thin layer of enamel glaze, firing the plural layers to vitrify and solidify the ceramic sheetware, and separating from the inert support the fired tile thus formed, which latter operation is facilitated after heating by the presence of the isolating layer.

3. A method as in claim 1 in which the support and the unfired pastes are preheated to additionally control the shrinkage of the kaolin-containing unfired paste.

4. A method as in claim 1 in which approximately 33% by weight of coarse scrap conforming to the vitrified composition of the tile product produced in claim 1 is added to the unfired aqueous paste of unidirectional shrinkage.

5. A method as in claim 1 in which the isolating paste layer, the other green ceramic paste layer of unidirectional shrinkage during firing and the top enamel glaze coating are successively applied in a continuous operation by means of three corresponding distributors which apply the respective layers to a moving inert refractory support.

6. A method as in claim 1 in which the plural layers are partially cut through a substantial portion of their combined thicknesses by means of a powerful fine fluid jet impinging perpendicularly thereon and along a predetermined path.

7. A method as in claim 1 in which the plural unfired layers are completely cut through their thickness by means of a powerful fine fluid jet impinging perpendicularly thereon and along a predetermined path.

ANTONINO DAL BORGO.

REFERENCES CITED

The following references are of record in the file of this patent:

UNITED STATES PATENTS

| Number | Name | Date |
|---|---|---|
| 45,974 | Chambers, Jr. | Jan. 24, 1865 |
| 1,345,377 | Linbarger | July 6, 1920 |
| 1,658,070 | Arehart | Feb. 7, 1928 |